United States Patent
Li et al.

(10) Patent No.: US 12,353,861 B2
(45) Date of Patent: Jul. 8, 2025

(54) INSTRUCTION-BASED PERFORMANCE PREDICTION FOR DEEP LEARNING ACCELERATOR

(71) Applicant: MEDIATEK INC., Hsinchu (TW)

(72) Inventors: Huai-Ting Li, Hsinchu (TW); I-Lin Chen, Hsinchu (TW); Tsai Jen Chieh, Hsinchu (TW); Cheng-Sheng Chan, Hsinchu (TW); ShengJe Hung, Hsinchu (TW); Yi-Min Tsai, Hsinchu (TW); Huang Ya-Lin, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 206 days.

(21) Appl. No.: 18/346,376

(22) Filed: Jul. 3, 2023

(65) Prior Publication Data

US 2024/0069878 A1    Feb. 29, 2024

Related U.S. Application Data

(60) Provisional application No. 63/373,874, filed on Aug. 30, 2022.

(51) Int. Cl.
*G06F 8/41* (2018.01)

(52) U.S. Cl.
CPC .............. *G06F 8/423* (2013.01); *G06F 8/433* (2013.01)

(58) Field of Classification Search
CPC ................................ G06F 8/423; G06F 8/433
See application file for complete search history.

(56) References Cited

U.S. PATENT DOCUMENTS

| 2019/0325108 | A1* | 10/2019 | Turek | G06N 3/08 |
| 2019/0384790 | A1* | 12/2019 | Bequet | G06N 3/084 |
| 2022/0076121 | A1* | 3/2022 | Choi | G06N 3/063 |
| 2022/0172044 | A1 | 6/2022 | Liu | |

OTHER PUBLICATIONS

Kothapalli et al., "A Performance Prediction Model for the CUDA GPGPU Platform" (Year: 2009).*
Bouzidi et al., "Performance Prediction for Convolutional Neural Networks on Edge GPUs" (Year: 2021).*

(Continued)

*Primary Examiner* — Phillip H Nguyen
(74) *Attorney, Agent, or Firm* — Winston Hsu

(57) ABSTRACT

Aspects of the present disclosure provide a method for training a predictor that predicts performance of a plurality of machine learning (ML) models on platforms. For example, the method can include converting each of the ML models into a plurality of instructions or the instructions and a plurality of intermediate representations (IRs). The method can also include simulating execution of the instructions corresponding to each of the ML models on a platform and generating instruction performance reports. Each of the instruction performance reports can be associated with performance of the instructions corresponding to one of the ML models that are executed on the platform. The method can also include training the predictor with the instructions or the IRs as learning features and the instruction performance reports as learning labels, compiling the predictor into a library file, and storing the library file in a storage device.

19 Claims, 7 Drawing Sheets

(56) References Cited

OTHER PUBLICATIONS

Ermao CAI, et al., "*NeuralPower*. Predict and Deploy Energy-Efficient Convolutional Neural Networks," Asian Conference on Machine Learning (ACML), Proceedings of Machine Learning Research (PMLR), vol. 77, 2017, pp. 622-637.

Li Lyna Zhang, et al., "nn-Meter: Towards Accurate Latency Prediction of Deep-Learning Model Inference on Diverse Edge Devices", MobiSys: Proceedings of the 19th Annual International Conference on Mobile Systems, Applications, and Services, Jun. 24-Jul. 2, 2021, pp. 81-93.

Li Guihong, et al., "FLASH: Fast Neural Architecture Search with Hardware Optimization", ACM Transactions on Embedded Computing Systems (TECS), vol. 20, Issue 5s, Article No. 63, Sep. 20, 2021, pp. 1-25.

Chuan-Chi Wang, et al., "Toward Accurate Platform-Aware Performance Modeling for Deep Neural Networks", ACM SIGAPP Applied Computing Review, vol. 21, No. 1, Jul. 20, 2021, pp. 50-61.

Han Cai, et al., "ProxylessNAS: Direct Neural Architecture Search on Target Task and Hardware", ICLR, arXiv:1812.00332v2 [cs.LG], Feb. 23, 2019, pp. 1-13.

Yang Ni, et al., "Online Performance and Power Prediction for Edge TPU via Comprehensive Characterization", IEEE Proceedings of The 2022 Conference & Exhibition on Design, Automation & Test in Europe, May 31, 2022, pp. 612-615.

Hadjer Benmeziane, et al., "Pareto Rank Surrogate Model for Hardware-aware Neural Architecture Search", IEEE International Symposium on Performance Analysis of Systems and Software (ISPASS), May 22-24, 2022, 4 pages (Abstract only).

Grace Chu, et al., "Discovering Multi-Hardware Mobile Models via Architecture Search", Proceedings of the IEEE/CVF Conference on Computer Vision and Pattern Recognition (CVPR), 2021, pp. 1-10.

Li Lyna Zhang, et al., "Fast Hardware-Aware Neural Architecture Search", Proceedings of the IEEE/CVF Conference on Computer Vision and Pattern Recognition (CVPR) Workshops, 2020, 9 pages.

Hanrui Wang, et al., "HAT: Hardware-Aware Transformers for Efficient Natural Language Processing", arXiv:2005.14187v1 [cs.CL], May 28, 2020, 14 pages.

Lukasz Dudziak, et al., "BRP-NAS: Prediction-based NAS using GCNs", 34TH Conference on Advances in Neural Information Processing Systems (NeurIPS), vol. 33, 2020, pp. 10480-10490.

Xiaoliang Dai, et al., "ChamNet: Towards Efficient Network Design through Platform-Aware Model Adaptation", Proceedings of the IEEE/CVF Conference on Computer Vision and Pattern Recognition, 2019, pp. 11398-11407.

Extended European Search Report issued Jan. 30, 2024 in European Patent Application No. 23193397.9, citing documents 24-28 therein, 12 pages.

Bouzidi, H., et al., "Performance Prediction for Convolutional Neural Networks on Edge GPUs", Proceedings of the 42nd ACM SIGPLAN International Conference on programming Language Design and Implementation, May 11-13, 2021, XP058758978, pp. 54-62.

Wang X., et al., "A Hybrid Framework for Fast and Accurate GPU Performance Estimation through Source-Level Analysis and Trace-Based Simulation", 2019 IEEE International Symposium on High Performance Computer Architecture (HPCA), Feb. 2019, XP033532508, pp. 506-518.

Chennupati G., et al., "Scalable Performance Prediction of Codes with Memory Hierarchy and Pipelines", In SIGSIM Principles of Advanced Discrete Simulation, Jun. 3-5, 2019, XP093120067, pp. 13-24.

Dubach, C., et al., "Fast Compiler Optimisation Evaluation Using Code-Feature Based Performance Prediction", Computing Frontiers, May 2007, XP058335166, pp. 131-141.

Stjerngren, A., et al., "Bifrost: End-to-End Evaluation and Optimization of Reconfigurable DNN Accelerators", 2022 IEEE International Symposium on Performance Analysis of Systems and Software (ISPASS), May 2022, XP034140854, pp. 288-299.

Halima Bouzidi et al., "Performance Prediction for Convolutional Neural Networks in Edge Devices", Oct. 21, 2020, pp. 1-10. (https://arxiv.org/abs/2010.11297) , Oct. 21, 2020.

* cited by examiner

INSTRUCTION-BASED PERFORMANCE PREDICTION FOR DEEP LEARNING ACCELERATOR

CROSS-REFERENCE TO RELATED APPLICATIONS

This present application claims the benefit of U.S. Provisional Application No. 63/373,874, filed on Aug. 30, 2022, which is incorporated herein by reference in its entirety.

TECHNICAL FIELD

The present disclosure relates to neural networks (NNs), and, more specifically, to instruction-based performance prediction for deep learning accelerator.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Artificial intelligence (AI) techniques, e.g., machine learning (ML), can be useful for solving a variety of myriad, complex computational problems. A ML model, such as a deep learning (DL) model, can be trained to extract and transform higher-level features from a set of training data. Before deployed on an edge device, a built and well-trained DL model is needed to be refined, e.g., its DL model architecture and operations, in order to meet the specification of the edge device, e.g., 30 frames per second (fps) for video applications. The refinement of the DL model can be done manually. Framework developers can also resort to some dedicated tools, e.g., automated machine learning (AutoML) tools, to refine their DL models. During the AutoML process, an accurate estimation of platform performance metrics is a factor to meet the specification of a given platform.

SUMMARY

Aspects of the present disclosure provide a method for training a predictor that predicts performance of a plurality of machine learning (ML) models on platforms. For example, the method can include converting each of the ML models into a plurality of instructions or the instructions and a plurality of intermediate representations (IRs). The method can also include simulating execution of the instructions corresponding to each of the ML models on a platform and generating instruction performance reports. Each of the instruction performance reports can be associated with performance of the instructions corresponding to one of the ML models that are executed on the platform. The method can also include training the predictor with the instructions or the IRs as learning features and the instruction performance reports as learning labels, compiling the predictor into a library file, and storing the library file in a storage device.

In an embodiment, each of the ML models can be converted into the instructions, and the predictor can be trained with the instructions as the learning features. In another embodiment, each of the ML models can be converted into the instructions and the IRs, and the predictor can be trained with the IRs as the learning features. For example, the IRs can include tokens, a parse tree or an annotated tree syntax.

In an embodiment, each of the instructions can include control flow fields that contain information to specify data dependency between the instructions. For example, each of the instructions can include a wakeup field that indicates next one or more instructions that a current instruction is going to wake up after complete execution of the current instruction, and a wait field that indicates previous one or more instructions that a current instruction has to wait and cannot be executed until complete execution of the previous instructions.

Aspects of the present disclosure also provide a system for training a predictor that predicts performance of a plurality of machine learning (ML) models on platforms. For example, the system can include: a first compiler configured to convert each of the ML models into a plurality of instructions or the instructions and a plurality of intermediate representations (IRs); an instruction performance report generator coupled to the first compiler, the instruction performance report generator configured to simulate execution of the instructions corresponding to each of the ML models on a platform and generate instruction performance reports, each of the instruction performance reports associated with performance of the instructions corresponding to one of the ML models that are executed on the platform; processing circuitry coupled to the first compiler and the instruction performance report generator, the processing circuitry configured to train the predictor with the instructions or the IRs as learning features and the instruction performance reports as learning labels; a second compiler coupled to the processing circuitry, the second compiler configured to compile the predictor into a library file; and a storage device coupled to the second compiler, the storage device configured to store the library file. In an embodiment, the instruction performance report generator can be a cycle-approximate performance simulator.

In an embodiment, each of the ML models can be converted into the instructions, and the predictor can be trained with the instructions as the learning features. In another embodiment, the first compiler can be a multi-pass compiler, each of the ML models can be converted into the instructions and the IRs, and the predictor can be trained with the IRs as the learning features. For example, the IRs can include tokens, a parse tree or an annotated tree syntax.

Aspects of the present disclosure also provide a non-transitory computer-readable storage medium with a computer program stored thereon, wherein the computer program, when executed by processor, implements a method for training a predictor that predicts performance of a plurality of machine learning (ML) models on platforms, the method comprising: converting each of the ML models into a plurality of instructions or the instructions and a plurality of intermediate representations (IRs); simulating execution of the instructions corresponding to each of the ML models on a platform and generating instruction performance reports, each of the instruction performance reports associated with performance of the instructions corresponding to one of the ML models that are executed on the platform; training the predictor with the instructions or the IRs as learning features and the instruction performance reports as learning labels; compiling the predictor into a library file; and storing the library file in a storage device.

Note that this summary section does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the present disclosure and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
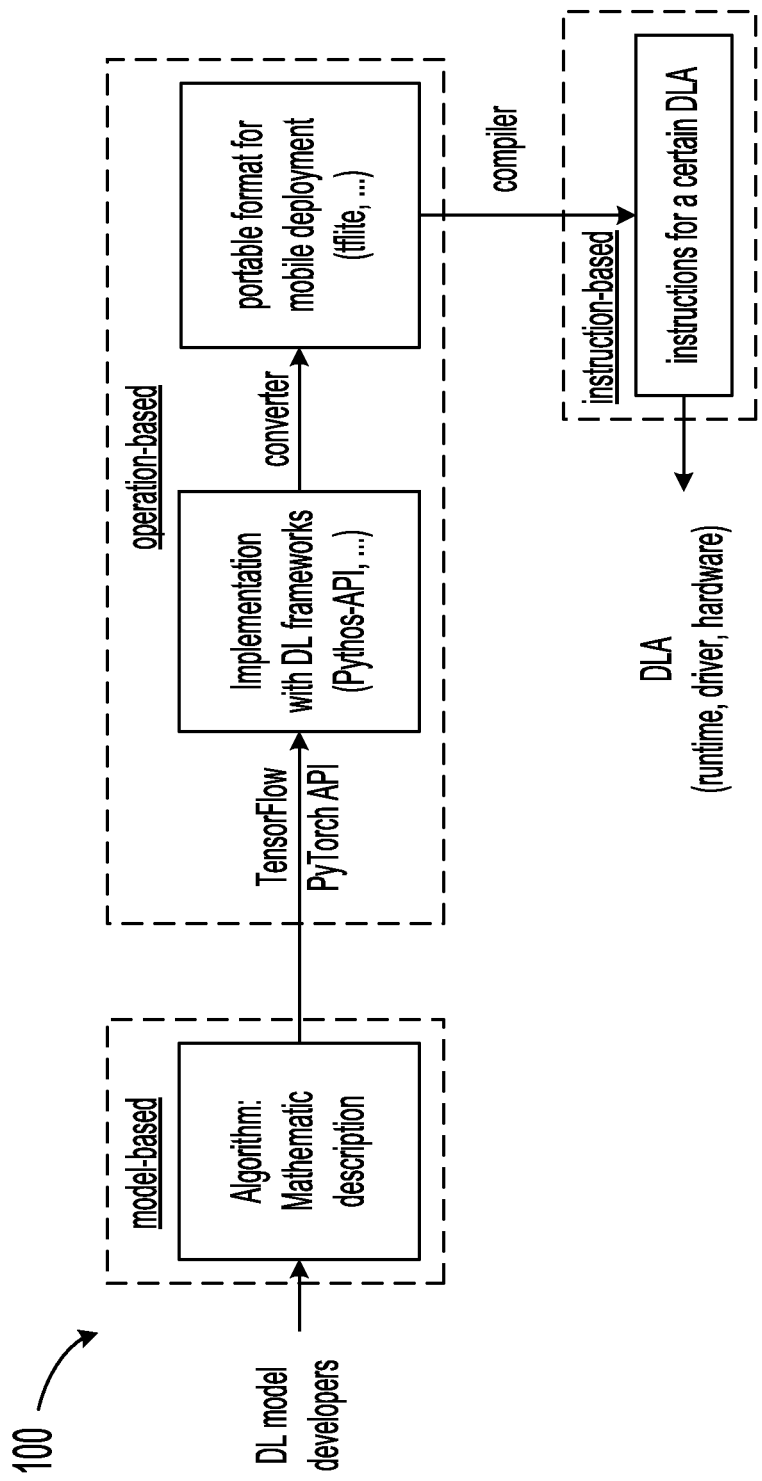
FIG. 1 shows the phases (the blocks with solid line) of building an ML model and executing it on a mobile device, the difference among model-based, operation-based, and instruction-based predictors being highlighted with dash line.

Artificial intelligence (AI) techniques, e.g., machine learning (ML), can be useful for solving a variety of myriad, complex computational problems, such as speech and image recognition, information analysis and classification, and machine translation. A ML model, such as a deep learning (DL) model, can be trained to extract and transform higher-level features from a set of training data. New data can then be applied to the well-trained DL model and be classified, for example, using the DL model.

Trained DL models can be deployed via a "Cloud" service. However, there are some drawbacks to cloud deployment, such as service expense, network connection latency and data security. Therefore, as many computations as possible are push to edge devices, such as mobile phones. Edge devices allow the DL models to run thereon in environments where there are no Internet services or where the Internet services are not reliable. Edge devices can also handle sensitive data, without worrying about a data breach, which is likely to occur in "Cloud." Because of these benefits that edge computing has over cloud computing, many edge devices are developed and optimized for different ML models.

Before deployed on an edge device, a built and well-trained DL model is needed to be refined, e.g., its DL model architecture and operations, in order to meet the specification of the edge device, e.g., 30 frames per second (fps) for video applications. The refinement of the DL model can be done manually, which, however, is laborsome and time consuming. Framework developers can also resort to some dedicated tools, e.g., automated machine learning (AutoML) tools, to refine their DL models. AutoML tools can iterate through models and hyperparameters more quickly than when done manually. For example, an AutoML tool can search and evaluate various architectures-a process known as neural architecture search (NAS)- and generate tens or even hundreds of thousands ML model candidates that all meet the specification of an edge device that the ML model is going to be deployed on.

As more and more ML models are deployed on edge devices, inference latency has become one of crucial metrics in running the DL models on the edge devices. The huge amount of ML model candidates can each be deployed on real edge devices, and framework developers can perform a laborious and expensive deployment process on these physical edge devices to obtain their inference latencies. In practice, a limited number of the edge devices will be provided, and only a small portion of the DL model candidates are allowed to run thereon to obtain the inference latencies. Instruction set simulators (ISS), e.g., instruction set cycle-approximate simulators, are proposed to mimic the behavior of a platform (e.g., a deep learning accelerator (DLA), such as central processing units (CPU), graphics processing units (GPU) and tensor processing units (TPU)) of an edge device), and measure the inference latencies of all the DL model candidates run on the platform. Cycle-approximate simulators, though obtaining accurate inference latency, are not efficient. For example, cycle-approximate simulators need to spend hours for large-resolution images, e.g., AI-Noise Reduction, to obtain the inference latency. Consequently, more efficient approaches have been proposed to predict the inference latency.

A floating point operations per second (FLOPs)-based method, which is simple and intuitive, is proposed to predict the inference latency. However, the FLOPs-based method is simply to calculate a number of multiplier-accumulator operations of a ML model, which, however, is not a direct metric of the inference latency.

Operation-based (or operator-based) predictors, e.g., a mathematical formula, rule-based, or a ML model that use features extracted from the attributes from TensorFlow/PyTorch API, TFLite OP, etc., are proposed to predict the inference latencies of ML models. FIG. 1 shows the phases (the blocks with solid line) 100 of building an ML model, e.g., a convolutional neural network (CNN), and executing it on a mobile device, the difference among model-based, operation-based, and instruction-based predictors being highlighted with dash line. DL model developers write algorithms with mathematical operations (or descriptions) supported by the API to describe their DL models. The API selects and trains a DL model (Tensorflow model), and converts the Tensorflow model using a converter to a Tensorflow Lite model (Tensorflow Lite flat buffer file (.tflite)). The optimized Tensorflow Lite model, after compiled by a compiler (e.g., TFLite interpreter) implemented in an edge device into machines codes (or instructions), can then be deployed on edge devices.

Operation-based predictors can predict the inference latency by summing up the latencies of all operations in a ML model. Operation-based predictors are easy to design and implement, and are general enough for many kinds of ML models by supporting all kinds of operations. However, it is hard for operation-based predictors to construct the whole-model inference latency as they do not have the knowledge of the exact execution order of operations on a given platform.

Model-based (graph information, mathematical abstraction, etc.) predictors are also proposed to predict the inference latencies of ML models. Contrary to the operation-based predictors, model-based predictors will consider operations and data dependency in the whole DL models while predicting the inference latencies of the ML models. However, as it is hard to define a general graph encoding for all kinds of DL models, the model-based predictors can be used in a limited scope, in terms of model architectures and operation types, and thus be dedicated to a certain optimization space.

A framework, e.g., a ML model (e.g., in TFLite format), cannot run on a piece of hardware (or a platform) (e.g., a deep learning accelerator (DLA), such as central processing units (CPU), graphics processing units (GPU) and tensor processing units (TPU)) of an edge device, unless the framework is supported by the hardware manufacturer. As CPUs, GPUs and TPUs have different memory layouts and compute primitives, mapping from ML models to these various DLAs requires fully understanding their hardware. It is thus time-consuming for engineers to provide support for a framework on a type of hardware (platform). Therefore, framework developers may provide support to only a limited number of hardware types, e.g., GPUs, and hardware manufacturers may offer their kernel libraries for a limited range of frameworks.

Intermediate representation (IR) is created as a "middle man" to bridge frameworks, e.g., ML models, and platforms, e.g., machines or hardware. With the IR, framework developers only need to translate their framework codes into this "middle man," without the need to support every type of hardware, and hardware manufacturers need to support only the IR, instead of supporting many ML models. A complier can generate, using a code generator (called a codegen), hardware-native codes from an IR. Specifically, the compiler can "lower" framework codes into hardware-native codes by first generating a series of high- and low-level IRs from the original framework codes for an ML model, which is hardware-agnostic, and then generate from these IRs hardware-native codes (or instructions), which are framework-agnostic, for hardware to run with.

Edge devices have limited capacity in terms of computing and storage, and the generated hardware codes (or instructions) thus may not perform well enough on the hardware. For example, the generated hardware codes may not take the advantage of data locality and hardware caches of a GPU. Accordingly, the hardware codes, before deployed on the edge devices, have to be optimized. For example, in the process of lowering ML model codes of a ML model into machine codes, compilers can look at the computation graph and its operations (e.g., convolution, loops, cross-entropy, etc.) of the ML model, and find a way to speed them up.

Generally, two ways, i.e., locally and globally, are used to speed up the hardware codes. Locally is referred to as optimizing one or more operations of ML models, while globally is referred to as optimizing the entire computation graph of the ML models. For example, local optimization techniques can include vectorization, parallelization, loop tiling, operator fusion, etc., which are used to make operations run in parallel or reduce memory access. Global optimization techniques can include fusing the computation graph of a ML model vertically or horizontally to reduce memory access and speed up the ML model.

The TFLite files generated by the converter need to be compiled by a compiler into machine codes (or instructions) in order to be deployed on edge devices. Given a TFLite file, the latency of different compiled results (e.g., instructions) compiled with different optimization strategies may be very different.

As the machine instructions generated by a compiler are located closer, in terms of execution by hardware, to the hardware than TFLite files from which the machine instructions are compiled, and thus contain more hardware-informative features, an instruction-based predictor can predict the latencies for ML models more accurately than the operation- and model-based predictors do.

Figure 2:
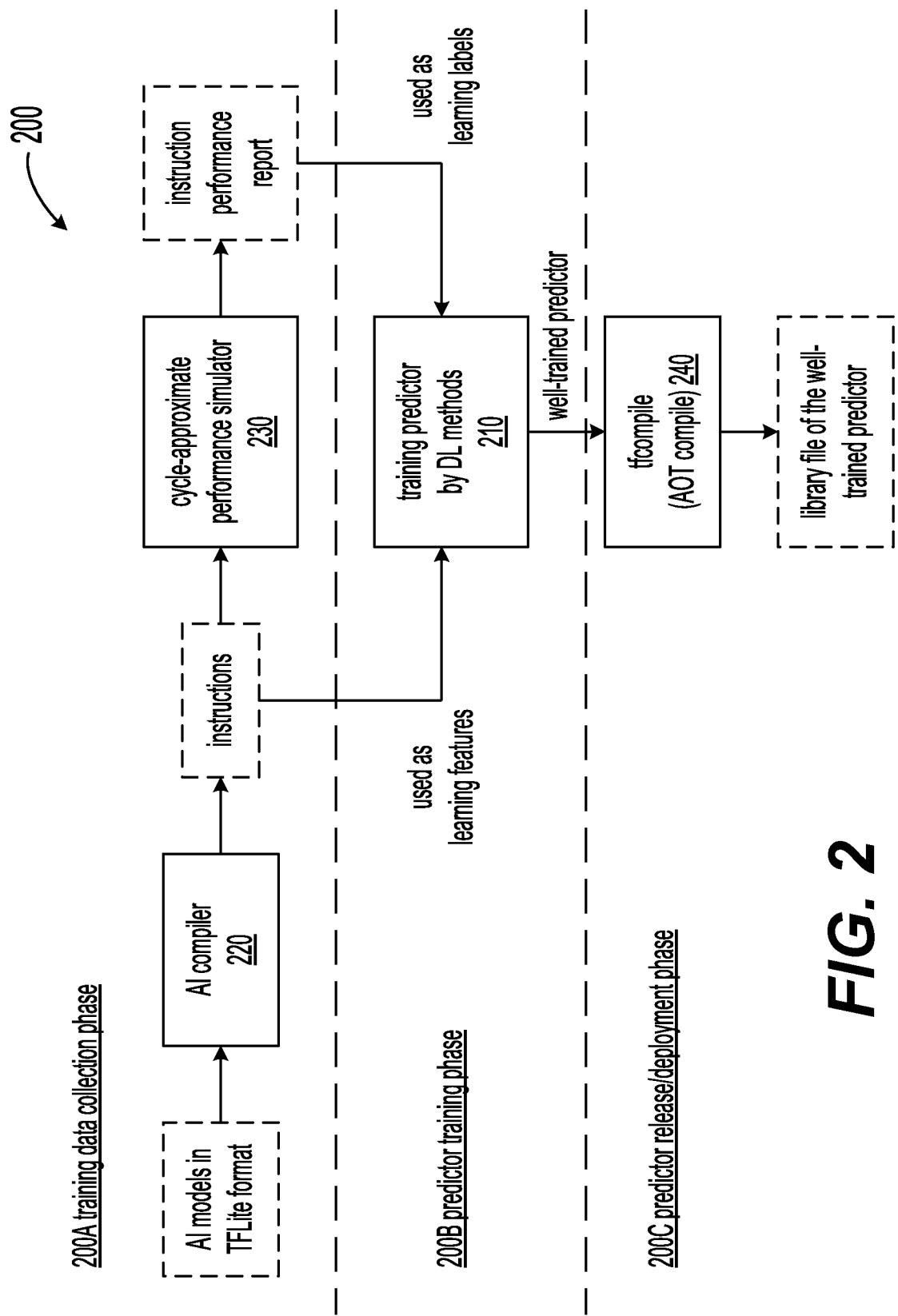
FIG. 2 shows an exemplary workflow of training an instruction-based predictor for ML models according to some embodiments of the present disclosure.

FIG. 2 shows an exemplary workflow 200 of training an instruction-based predictor 210 for ML models according to some embodiments of the present disclosure. The workflow 200 can include three phases, e.g., a training data collection phase 200A, a predictor training phase 200B and a predictor release/deployment phase 200C. As shown in FIG. 2, during the training data collection phase 200A AI models (e.g., ML models (e.g., TFLite files in TFLite format)) generated by TensorFlow, for example, can be input to a compiler 220, e.g., an AI compiler. The AI compiler 220 can convert the high-level TFLite files into machine instructions (e.g., instruction set architecture (ISA)) that can be deployed on hardware, e.g., edge devices such as mobile phones.

In the exemplary workflow 200, the machine instructions generated by the AI compiler 220 can be used to train the predictor 210, e.g., a ML model. In an embodiment, the machine instructions can be input to an instruction performance report generator 230, e.g., a hardware simulator such as cycle-approximate performance simulator, that can generate an instruction performance report (e.g., in csv format) associated with performance of the machine instructions executed on a platform (or hardware), e.g., DLAs. For example, the instruction performance report can include execution latency, power consumed, memory usage (i.e., DLA accessing outside memory, e.g., system-level memory such as DRAM), etc. for each of the machine instructions performed on the DLA, as listed in the following table.

| | instruction performance report | | | |
|---|---|---|---|---|
| instruction ID | execution latency | power consumption | memory usage | others . . . |
| #1 | 100 | 50 | 600 | . . . |
| #2 | 200 | 30 | 200 | . . . |
| . . . | . . . | . . . | . . . | . . . |

During the predictor training phase 200B, the predictor 210 can be trained, using the machine instructions generated by the AI compiler 220 as learning features and the instruction performance report generated by the cycle-approximate performance simulator 230 as learning labels, to predict the inference latency of each of the ML models generated by the TensorFlow API, for example.

During the predictor release/deployment phase 200C, the well-trained instruction-based predictor 210 can be compiled into a library file (e.g., a .so file), e.g., by a tfcompile 240 such as AOT compile. Accordingly, auto-ML users can call the .so file to predict the inference latencies, power consumption and/or memory usage of various ML models, for example.

In the exemplary workflow 200, the instruction-based predictor 210 is trained to predict the metrics e.g., latencies, power consumed, memory accessed, etc. of ML models with hardware-informative features that are based on compiled results (i.e., machine instructions) of a compiler and are closer than the ML models to hardware (or platform). Therefore, the instruction-based predictor 210 can generate more accurate metrics prediction of ML models than operation- and model-based predictors do.

Figure 3:
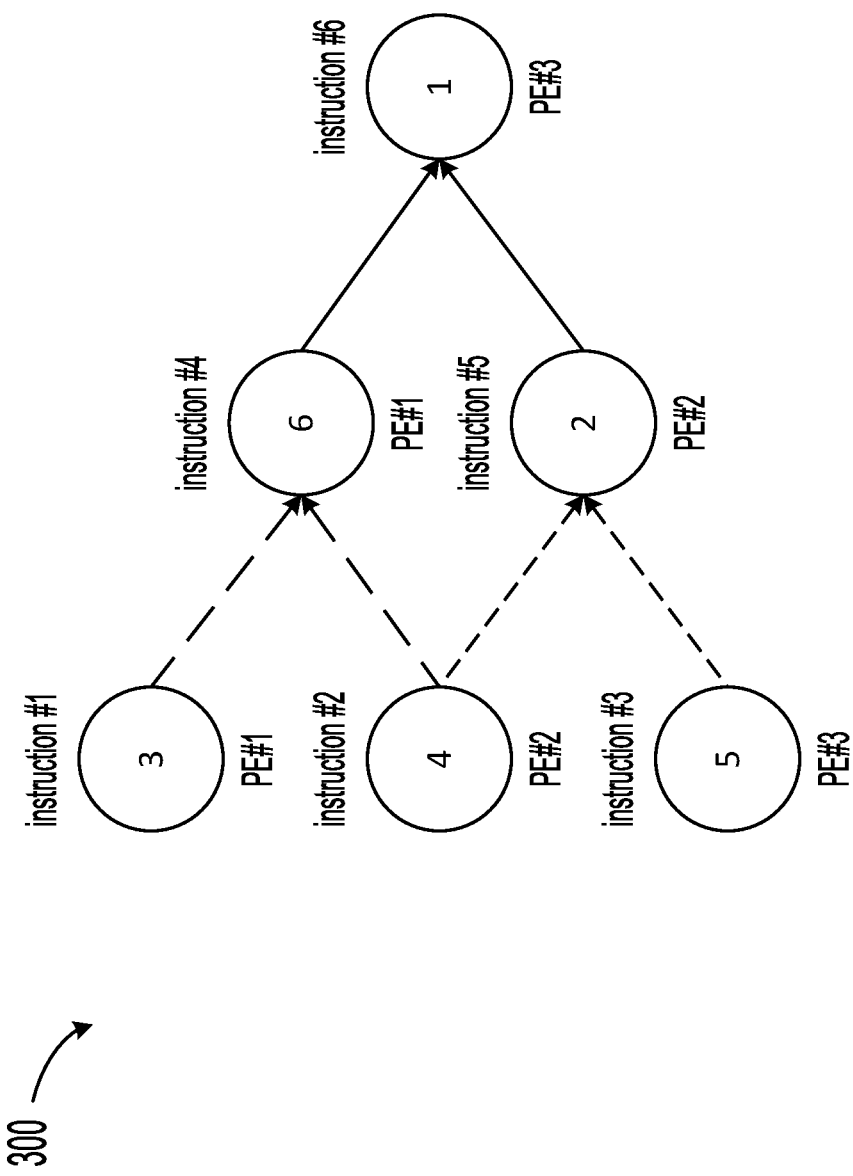
FIG. 3 shows instructions compiled during the workflow shown in FIG. 2 that correspond to an operation graph of a ML model according to some embodiments of the present disclosure.

FIG. 3 shows exemplary instructions compiled, e.g., by the AI compiler 220, during the workflow shown in FIG. 2 that correspond to an operation graph of a refined ML model 300 according to some embodiments of the present disclosure. For example, six machines instructions #1 to #6 are shown that correspond to six operations of the refined ML model 300 that are connected. Machine instruction #6 depends on the results of instructions #4 and #5, machine instruction #4 depends on the results of machine instructions #1 and #2, and machine instruction #5 depends on the results of machine instructions #2 and #3. An edge device that the ML model 300 is going to be deployed on has three processing elements (PEs) #1, #2 and #3, in which PEs #1, #2 and #3 can execute in parallel instructions #1, #2 and #3, respectively, PEs #1 and #2 can execute in parallel instructions #4 and #5, respectively, and PE #3 can execute instruction #6. The inference latencies of the six machine instructions #1 to #6 executed on PEs #1, #2 and #3 are "3," "4," "5," "6," "2" and "1," respectively, which can be obtained from the instruction performance report generated by the instruction performance report generator 230. The predictor 210 can be trained using the six machine instructions #1 to #6 as learning features and the six inference latencies "3," "4," "5," "6," "2" and "1" as learning labels.

Figure 4:
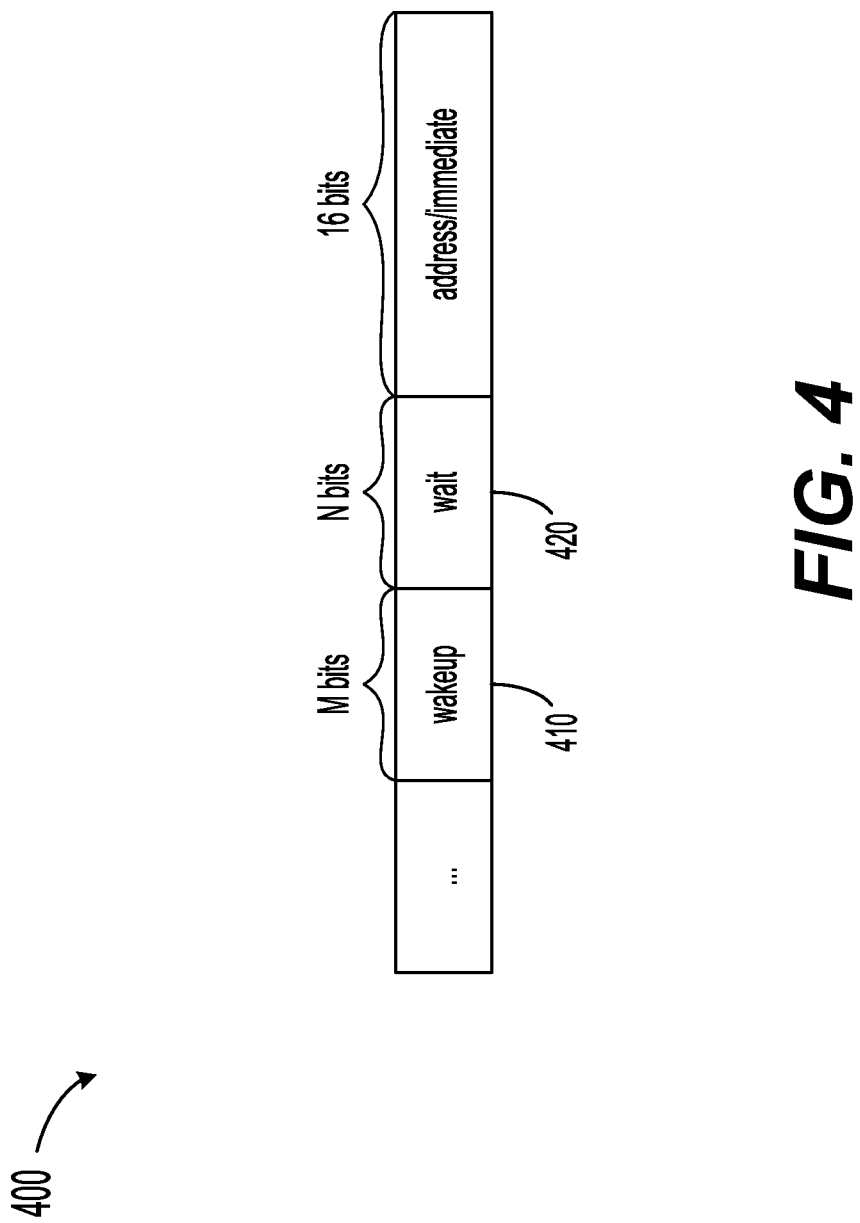
FIG. 4 shows an exemplary format of instructions in an exemplary instruction set architecture (ISA) according to some embodiments of the present disclosure.

FIG. 4 shows an exemplary format of instructions 400 in an exemplary instruction set architecture (ISA) according to some embodiments of the present disclosure. In an embodiment, the instructions 400 in the ISA can be compiled by the AI compiler 220 and used for DLAs on which ML models run that have metrics, e.g., execution latencies, power consumption, memory usage, etc., predicted by the instruction-based predictor 210. Also refer to FIG. 3 and the following table.

| instruction | Fields of Instructions (compiled results) | | | |
|---|---|---|---|---|
| ID | others | wakeup | wait | others |
| #1 | ... | #4 | — | ... |
| #2 | ... | #4, #5 | — | ... |
| #3 | ... | #5 | — | ... |
| #4 | ... | #6 | #1, #2 | ... |
| #5 | ... | #6 | #2, #3 | ... |
| #6 | ... | — | #4, #5 | ... |

In an embodiment, each of the instructions 400 can include one or more control flow fields. For example, each of the instructions 400 can include a wakeup field 410 and a wait field 420, among other fields. The control flow fields can contain information to specify the data dependency between instructions. In an embodiment, the wakeup field 410 can indicate next one or more instructions that a current instruction is going to wake up after complete execution of the current instruction. In another embodiment, the wait field 420 can indicate previous one or more instructions that a current instruction has to wait and cannot be executed until complete execution of the previous instructions.

For example, instruction #1 indicates in the wakeup field 410 instruction #4 that it is going to wake up after its complete execution, instruction #2 indicates in the wakeup field 410 instructions #4 and #5 that it is going to wake up after its complete execution, and instruction #3 indicates in the wakeup field 410 instruction #5 that it is going to wake up after its complete execution. As being located in the first layer of a ML model, instructions #1, #2 and #3 contain no information in their wait field 420.

As another example, instruction #4 indicates in the wakeup field 410 instruction #6 that it is going to wake up after its complete execution and in the wait field 420 instructions #1 and #2 that it has to wait and cannot be executed until their complete execution, and instruction #5 indicates in the wakeup field 410 instruction #6 that it is going to wake up after its complete execution and in the wait field 420 instructions #2 and #3 that it has to wait and cannot be executed until their complete execution. As being located in the middle layer of the ML model, instructions #4 and #5 contain information in both the wakeup field 410 and the wait field 420.

In yet another example, instruction #6 indicates in the wait field 420 instructions #4 and #5 that it has to wait and cannot be executed until their complete execution. As being located in the last layer of the ML model, instruction #5 contains no information in its wakeup field 410.

The end time of execution of instruction #i can be determined by the following equation $$E_i = \max_{j \ni \text{wait of } i}(E_j) + T_i \quad (1)$$

where $E_i$ is the end time of execution of instruction #i, and $T_i$ is the execution latency of instruction #i.

For example, the end time $E_1$, $E_2$ and $E_3$ of execution of instructions #1, #2 and #3, which can be executed in parallel on the PEs #1, #2 and #3, respectively, are $T_1$ (3), $T_2$ (4) and $T_3$ (5), respectively, as their wait fields 420 contain no information. As another example, the end time $E_4$ and E s of execution of instructions #4 and #5, which can be executed in parallel on the PEs #1 and #2, respectively, are max ($E_1$, $E_2$) (or max ($T_1$ (3), $T_2$ (4)))+$T_4$ (6) and max ($E_2$ and $E_3$) (or max ($T_2$ (4), $T_3$ (5)))+$T_5$ (2), respectively, as their wait fields 420 indicate instructions #1 and #2 and instructions #2 and #3, respectively. In yet another example, the end time $E_6$ of execution of instruction #6, which can be executed on the PE #3, is max ($E_4$, $E_5$) (or max (max ($E_1$, $E_2$)+$T_4$ (6), max ($E_2$, $E_3$)+$T_5$ (2)))+$T_6$ (1), as its wait field 420 indicates instruction #4 and #5. It can thus be known that the critical path of the ML model is instruction #2→instruction #4→instruction #6, and the execution latency of the ML model is 4+6+1=11.

As having the knowledge of the data dependencies of the ML model 300 and the parallel execution of the PEs of the edge device, the instruction-based predictor 210 can accurately predict that the inference latency of the ML model 300 on the edge device is 4+6+1=11, i.e., the sum of the inference latencies of the instructions in a critical path (instruction #2→instruction #4→instruction #6) connecting machine instructions #2, #4 and #6 sequentially.

In an embodiment, a DLA on which a ML model runs (or instructions #1 to #6 execute) can have multiple PEs that can execute instructions in parallel, e.g., PEs #1 to #3, and therefore the predicted inference latency of the ML model deployed on the DLA can be the sum of the inference latencies of the instructions in a critical path. In another embodiment, a DLA on which a ML model runs can have a single PE, and therefore the predicted inference latency of the ML model deployed on the DLA can be a sum of the inference latencies of all the instructions.

Figure 5:
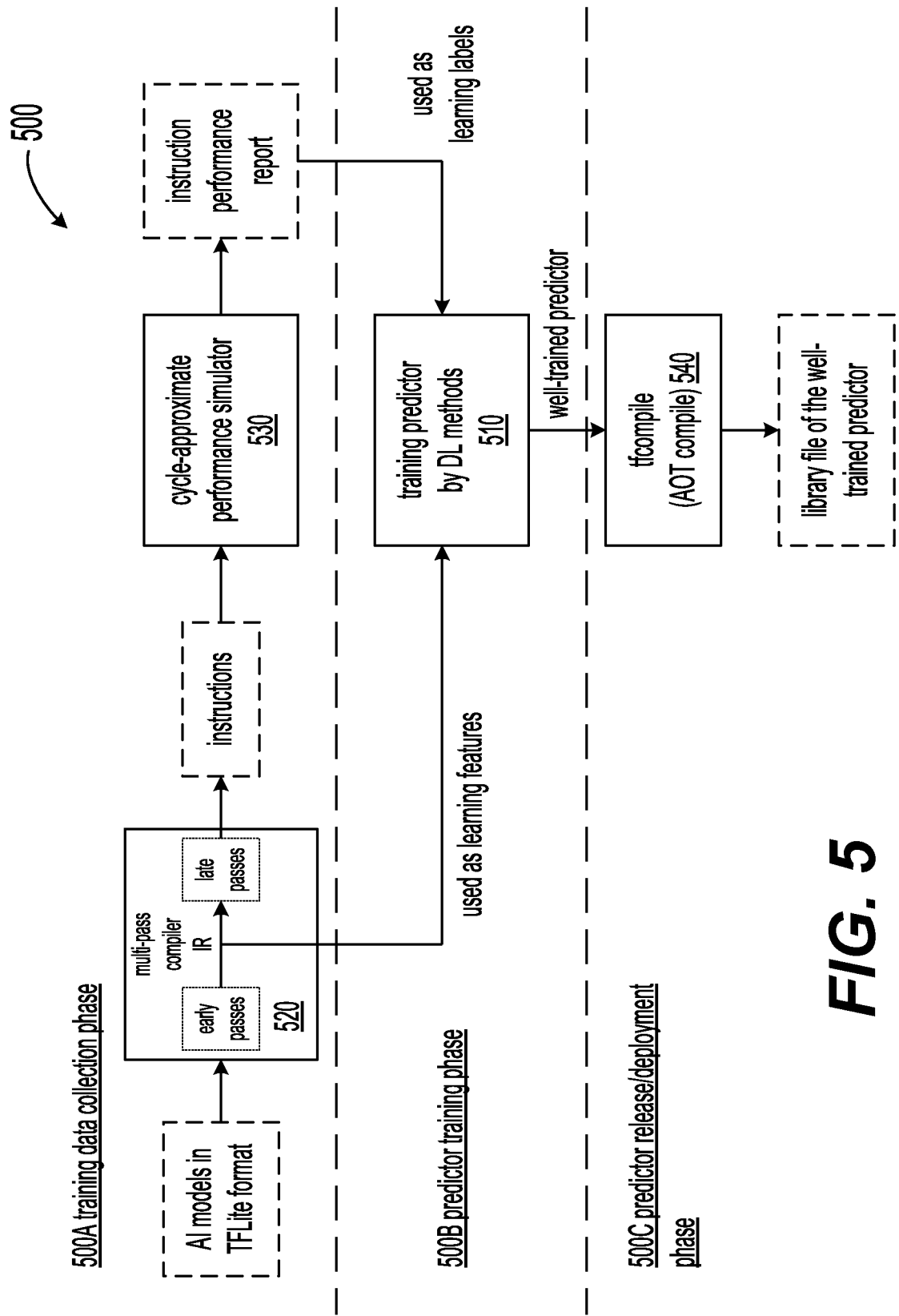
FIG. 5 shows another exemplary workflow of training an instruction-based predictor for ML models according to some embodiments of the present disclosure.

FIG. 5 shows an exemplary workflow 500 of training an instruction-based predictor 510 for ML models according to some embodiments of the present disclosure. The workflow 500 differs from the workflow 200 shown in FIG. 3 in that a multi-pass (or wide) compiler 520 replaces the compiler 220, which is a one-pass compiler, and a predictor 510 is trained by intermediate representations (IRs) generated by the multi-pass compiler 520 at various stages (or phases). The workflow 500 can also include three phases, e.g., a training data collection phase 500A, a predictor training phase 500B and a predictor release/deployment phase 500C.

As shown in FIG. 5, during the training data collection phase 500A AI models (e.g., ML models (e.g., TFLite files in TFLite format)) generated by TensorFlow, for example, can be input to the multi-pass compiler 520, e.g., an AI compiler. The multi-pass AI compiler 520 can convert the high-level TFLite files into machine instructions that can be deployed on hardware, e.g., edge devices such as mobile phones.

In an embodiment, the multi-pass compiler 520 can include lexical analysis stage, a syntax analysis stage, a semantic analysis stage (e.g., collectively referred to as early passes) and a code generation stage (e.g., referred to as late passes). At the lexical analysis stage, irrelevant information, e.g., comments and white space, can be removed from the source program (or source code), e.g., TFLite files, and the source program can be read one character at a time and converted into meaningful lexemes in the form of tokens. At the syntax analysis stage, the tokens can be checked, e.g., by a parser, if the expression made by the tokens is syntactically correct or not, and a parse tree (or IR) can be generated. At the semantic analysis stage, the parse tree can be checked if it follows the rules (i.e., semantic rules) of language, and an annotated tree syntax and symbol tables can be generated. In the code generation stage, the IR of program can be converted into an executable set of machine instructions (e.g., assembly).

In the exemplary workflow 500, the IR generated by the multi-pass compiler 520 at any stage, e.g., the tokens, the parse tree and the annotated tree syntax, can be used to train the predictor 510. In an embodiment, the machine instructions generated at the code generation stage can be input to an instruction performance report generator 530, e.g., a hardware simulator such as cycle-approximate performance simulator, and an instruction performance report (e.g., in csv format) can be generated that is associated with performance of the machine instructions executed on a platform (or hardware), e.g., DLAs. For example, the instruction performance report can include execution latency, power consumed, memory usage (i.e., DLA accessing outside memory, e.g., system-level memory such as DRAM), etc. for each of the machine instructions performed on the DLA.

During the predictor training phase 500B, the predictor 510 can be trained, using the IR generated by the multi-pass compiler 520 as learning features and the instruction performance report generated by the cycle-approximate performance simulator 530 as learning labels, to predict the inference latency of each of the ML models generated by the TensorFlow API, for example. Accordingly, one of the TensorFlow models that has, for example, the lowest inference latency, power consumption and/or memory usage for the DLA can be selected with the help of the well-trained instruction-based predictor 510.

During the predictor release/deployment phase 500C, the well-trained instruction-based predictor 510 can be compiled into a library file (e.g., a .so file), e.g., by a tfcompile 540 such as AOT compile. Accordingly, framework developers can call the .so file to predict the inference latencies, power consumption and/or memory usage of various ML models generated TensorFlow API, for example.

Figure 6:
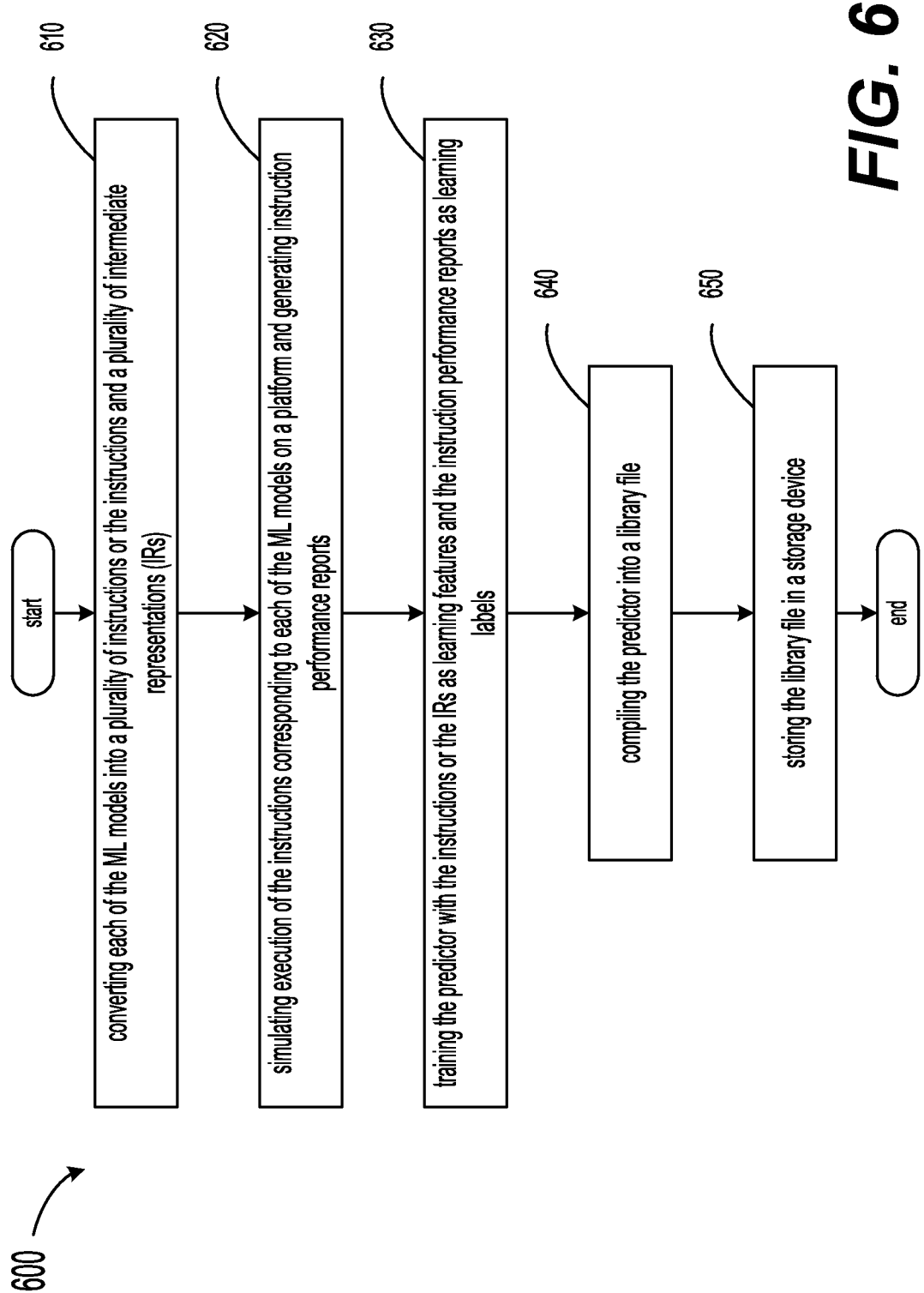
FIG. 6 is a flow chart of an exemplary method for training a predictor that can predict performance of a plurality of ML models on platforms according to some embodiments of the present disclosure.

FIG. 6 is a flow chart of an exemplary method 600 for training a predictor, e.g., the predictor 210 or the predictor 510, that can predict performance of a plurality of ML models on platforms according to some embodiments of the present disclosure. In an embodiment, some of the steps of the method 600 shown can be performed concurrently, in a different order than shown, can be substituted for by other method step, or can be omitted. Additional method steps can also be performed as desired.

At step S610, each of the ML models can be converted into a plurality of instructions or the instructions and a plurality of intermediate representations (IRs). In an embodiment, each of the instructions can include control flow fields that contain information to specify data dependency between the instructions. For example, each of the instructions can include a wakeup field, e.g., the wakeup field 410, that indicates next one or more instructions that a current instruction is going to wake up after complete execution of the current instruction, and a wait field, e.g., the wait field 420, that indicates previous one or more instructions that a current instruction has to wait and cannot be executed until complete execution of the previous instructions.

At step S620, execution of the instructions corresponding to each of the ML models can be simulated on a platform and instruction performance reports are generated. In an embodiment, each of the instruction performance reports can be associated with performance of the instructions corresponding to one of the ML models that are executed on the platform.

At step S630, the predictor can be trained with the instructions or the IRs as learning features and the instruction performance reports as learning labels. In an embodiment, each of the ML models can be converted into the instructions, and the predictor can be trained with the instructions as the learning features. In another embodiment, each of the ML models can be converted into the instructions and the IRs, and the predictor can be trained with the IRs as the learning features. For example, the IRs can include tokens, a parse tree or an annotated tree syntax.

At step S640, the predictor can be compiled into a library file.

At step S650, the library file can be stored in a storage device.

Figure 7:
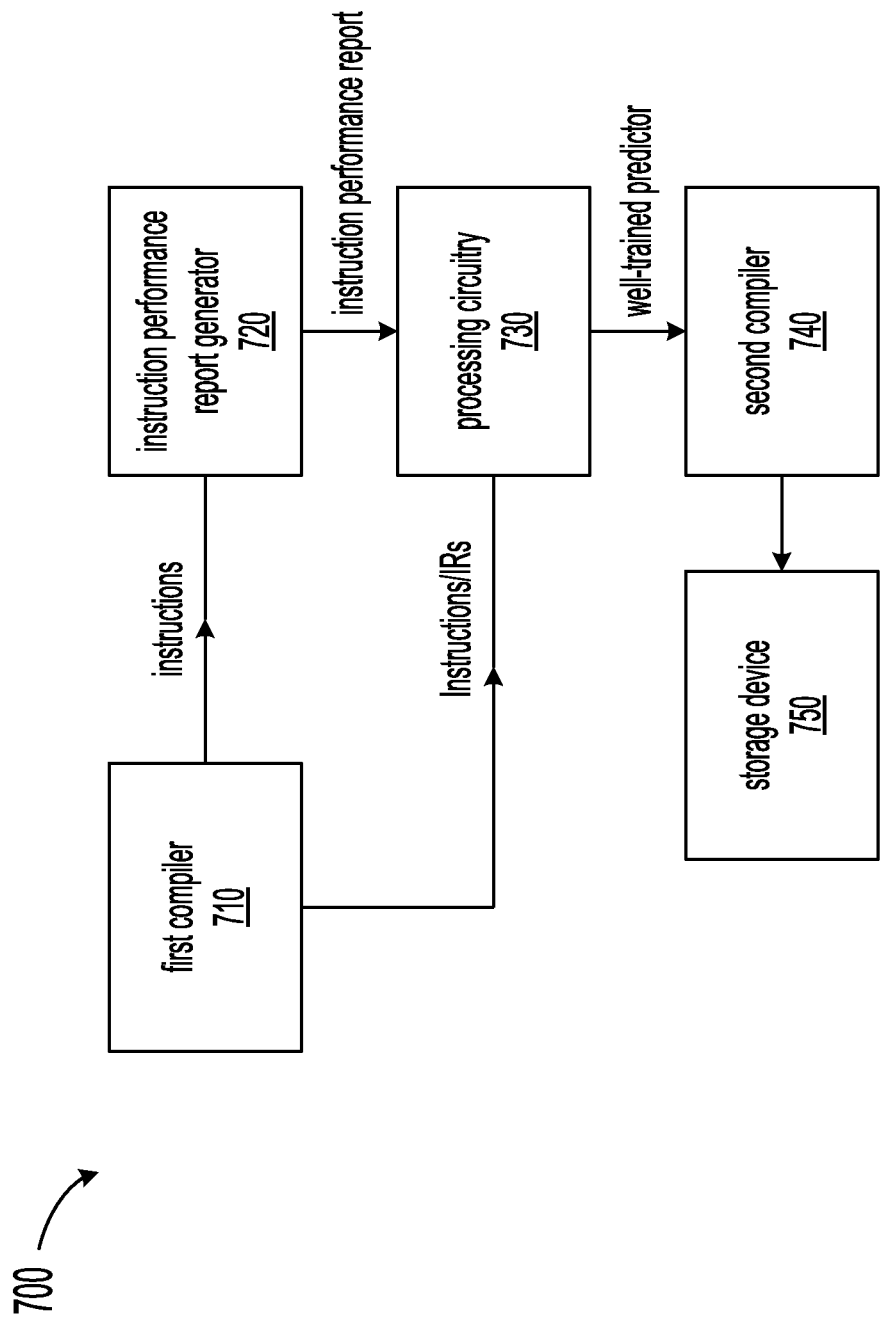
FIG. 7 is a functional block diagram of an exemplary system for training a predictor that predicts performance of a plurality of ML models on platforms.

FIG. 7 is a functional block diagram of an exemplary system 700 for training a predictor that predicts performance of a plurality of ML models on platforms. For example, the system 700 can include a first compiler 710, an instruction performance report generator 720 coupled to the first compiler 710, processing circuitry 730 coupled to the first compiler 710 and the instruction performance report generator 720, a second compiler 740 coupled to the processing circuitry 730, and a storage device 750 coupled to the second compiler 740. The system 700 can be used to implement the method 600.

In an embodiment, the first compiler 710 can be configured to convert each of the ML models into a plurality of instructions or the instructions and a plurality of intermediate representations (IRs). In an embodiment, each of the instructions can include control flow fields that contain information to specify data dependency between the instructions. For example, each of the instructions can include a wakeup field, e.g., the wakeup field 410, that indicates next one or more instructions that a current instruction is going to wake up after complete execution of the current instruction, and a wait field, e.g., the wait field 420, that indicates previous one or more instructions that a current instruction has to wait and cannot be executed until complete execution of the previous instructions.

In an embodiment, the instruction performance report generator 720 such as an instruction set simulator (ISS), e.g., a cycle-approximate performance simulator, can be configured to simulate execution of the instructions corresponding to each of the ML models on a platform and generate instruction performance reports. For example, each of the instruction performance reports can be associated with performance of the instructions corresponding to one of the ML models that are executed on the platform.

In an embodiment, the processing circuitry 730 can be configured to train the predictor with the instructions or the IRs as learning features and the instruction performance reports as learning labels. In an embodiment, each of the ML models can be converted into the instructions, and the predictor can be trained with the instructions as the learning features. In another embodiment, each of the ML models can be converted into the instructions and the IRs, and the predictor can be trained with the IRs as the learning features. For example, the IRs can include tokens, a parse tree or an annotated tree syntax.

In an embodiment, the second compiler can be configured to compile the predictor into a library file.

In an embodiment, the storage device can be configured to store the library file.

Aspects of the present disclosure also provide a non-transitory computer-readable storage medium with a computer program stored thereon, wherein the computer program, when executed by processor, implements a method for training a predictor that predicts performance of a plurality of ML models on platforms, the method comprising: converting each of the ML models into a plurality of instructions or the instructions and a plurality of intermediate representations (IRs); simulating execution of the instructions corresponding to each of the ML models on a platform and generating instruction performance reports, each of the instruction performance reports associated with performance of the instructions corresponding to one of the ML models that are executed on the platform; training the predictor with the instructions or the IRs as learning features and the instruction performance reports as learning labels; compiling the predictor into a library file; and storing the library file in a storage device.

In an embodiment, each of the ML models can be converted into the instructions, and the predictor can be trained with the instructions as the learning features. In another embodiment, the first compiler can be a multi-pass compiler, each of the ML models can be converted into the instructions and the IRs, and the predictor is trained with the IRs as the learning features. For example, the IRs can include tokens, a parse tree or an annotated tree syntax.

In an embodiment, each of the instructions can include control flow fields that contain information to specify data dependency between the instructions. For example, each of the instructions can include a wakeup field that indicates next one or more instructions that a current instruction is going to wake up after complete execution of the current instruction, and a wait field that indicates previous one or more instructions that a current instruction has to wait and cannot be executed until complete execution of the previous instructions.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for training a predictor that predicts performance of a plurality of machine learning (ML) models on platforms, the method comprising:
   converting each of the ML models into a plurality of instructions or the instructions and a plurality of intermediate representations (IRs);
   simulating execution of the instructions corresponding to each of the ML models on a platform and generating instruction performance reports, each of the instruction performance reports associated with performance of the instructions corresponding to one of the ML models that are executed on the platform;
   training the predictor with the instructions or the IRs as learning features and the instruction performance reports as learning labels;
   compiling the predictor into a library file; and
   storing the library file in a storage device.

2. The method of claim 1, wherein each of the ML models is converted into the instructions, and the predictor is trained with the instructions as the learning features.

3. The method of claim 1, wherein each of the ML models is converted into the instructions and the IRs, and the predictor is trained with the IRs as the learning features.

4. The method of claim 3, wherein the IRs include tokens, a parse tree or an annotated tree syntax.

5. The method of claim 1, wherein each of the instructions includes control flow fields that contain information to specify data dependency between the instructions.

6. The method of claim 5, wherein each of the instructions includes a wakeup field that indicates next one or more instructions that a current instruction is going to wake up after complete execution of the current instruction, and a wait field that indicates previous one or more instructions that a current instruction has to wait and cannot be executed until complete execution of the previous instructions.

7. A system for training a predictor that predicts performance of a plurality of machine learning (ML) models on platforms, the system comprising:
   a first compiler configured to convert each of the ML models into a plurality of instructions or the instructions and a plurality of intermediate representations (IRs);
   an instruction performance report generator coupled to the first compiler, the instruction performance report generator configured to simulate execution of the instructions corresponding to each of the ML models on a platform and generate instruction performance reports, each of the instruction performance reports associated with performance of the instructions corresponding to one of the ML models that are executed on the platform;
   processing circuitry coupled to the first compiler and the instruction performance report generator, the processing circuitry configured to train the predictor with the instructions or the IRs as learning features and the instruction performance reports as learning labels;
   a second compiler coupled to the processing circuitry, the second compiler configured to compile the predictor into a library file; and a storage device coupled to the second compiler, the storage device configured to store the library file.

8. The system of claim 7, wherein each of the ML models is converted into the instructions, and the predictor is trained with the instructions as the learning features.

9. The system of claim 7, wherein the first compiler is a multi-pass compiler, each of the ML models is converted into the instructions and the IRs, and the predictor is trained with the IRs as the learning features.

10. The system of claim 9, wherein the IRs include tokens, a parse tree or an annotated tree syntax.

11. The system of claim 7, wherein each of the instructions includes control flow fields that contain information to specify data dependency between the instructions.

12. The system of claim 11, wherein each of the instructions includes a wakeup field that indicates next one or more instructions that a current instruction is going to wake up after complete execution of the current instruction, and a wait field that indicates previous one or more instructions that a current instruction has to wait and cannot be executed until complete execution of the previous instructions.

13. The system of claim 7, wherein the instruction performance report generator is a cycle-approximate performance simulator.

14. A non-transitory computer-readable storage medium with a computer program stored thereon, wherein the computer program, when executed by processor, implements a method for training a predictor that predicts performance of a plurality of machine learning (ML) models on platforms, the method comprising:
converting each of the ML models into a plurality of instructions or the instructions and a plurality of intermediate representations (IRs);
simulating execution of the instructions corresponding to each of the ML models on a platform and generating instruction performance reports, each of the instruction performance reports associated with performance of the instructions corresponding to one of the ML models that are executed on the platform;
training the predictor with the instructions or the IRs as learning features and the instruction performance reports as learning labels;
compiling the predictor into a library file; and
storing the library file in a storage device.

15. The non-transitory computer-readable storage medium of claim 14, wherein each of the ML models is converted into the instructions, and the predictor is trained with the instructions as the learning features.

16. The non-transitory computer-readable storage medium of claim 14, wherein each of the ML models is converted into the instructions and the IRs, and the predictor is trained with the IRs as the learning features.

17. The non-transitory computer-readable storage medium of claim 16, wherein the IRs include tokens, a parse tree or an annotated tree syntax.

18. The non-transitory computer-readable storage medium of claim 14, wherein each of the instructions includes control flow fields that contain information to specify data dependency between the instructions.

19. The non-transitory computer-readable storage medium of claim 18, wherein each of the instructions includes a wakeup field that indicates next one or more instructions that a current instruction is going to wake up after complete execution of the current instruction, and a wait field that indicates previous one or more instructions that a current instruction has to wait and cannot be executed until complete execution of the previous instructions.

\* \* \* \* \*